United States Patent [19]

Färber et al.

[11] Patent Number: 5,168,714
[45] Date of Patent: Dec. 8, 1992

[54] ASSEMBLY, ESPECIALLY FOR A BEVERAGE-VENDING MACHINE, WITH A CONTAINER FOR THE STORAGE, COOLING AND CARBONATING OF WATER

[75] Inventors: Karlheinz Färber, Giengen; Anton Deininger, Bachhagel; Michael Rosenbauer, Reimlingen, all of Fed. Rep. of Germany

[73] Assignees: The Coca-Cola Company, Atlanta, Ga.; Bosch-Siemens Hausgerate GmbH, Munich, Fed. Rep. of Germany

[21] Appl. No.: 745,389

[22] Filed: Aug. 15, 1991

[30] Foreign Application Priority Data

Aug. 16, 1990 [DE] Fed. Rep. of Germany ....... 4025985

[51] Int. Cl.[5] .............................................. F25C 1/00
[52] U.S. Cl. .................................... 62/138; 340/580
[58] Field of Search ........................ 62/138, 139, 59; 340/580

[56] References Cited

U.S. PATENT DOCUMENTS

| | | | |
|---|---|---|---|
| 3,496,733 | 2/1970 | Parker et al. | 62/139 |
| 4,497,179 | 2/1985 | Iwans | 62/139 |
| 4,655,050 | 4/1987 | Aschberger et al. | 62/139 X |
| 4,843,830 | 7/1989 | Haul | 62/139 |

Primary Examiner—William E. Wayner
Attorney, Agent, or Firm—Birch, Stewart, Kolasch & Birch

[57] ABSTRACT

An assembly, especially for a beverage-vending machine with a container for the storing, cooling and carbonating of water including two measuring electrodes arranged in the container at differing horizontal and vertical distances from an electrically conductive inner wall of the container connected to ground, one of these in the area of the ice layer under formation. The measuring electrodes obtain resistance values for the ice and/or water that arise between the electrode and the inner wall of the container. In order to cool the water independently from its physical-chemical composition, potentials corresponding to the resistances are derived and are supplied to a differential amplifier. Depending on a size comparison of the two resistance values, a cooling apparatus that affects the contents of the container is switched on or off.

12 Claims, 6 Drawing Sheets

ASSEMBLY, ESPECIALLY FOR A BEVERAGE-VENDING MACHINE, WITH A CONTAINER FOR THE STORAGE, COOLING AND CARBONATING OF WATER

BACKGROUND OF THE INVENTION

The present invention relates to an assembly especially for a post-mix beverage-vending machine with a container that serves for the storage, cooling and carbonating of water, that is equipped with an inlet, an outlet and an electrically conductive interior wall. Inside the container the water is cooled and forms an ice layer around the interior of the side walls of the container by means of heat exchange from a cooling apparatus mounted near the side wall. The container also includes a control circuit assembly that contains a first measuring electrode, between which, and the inner wall of the container, an ohmic resistance forms that is variable in the stored medium depending on the thickness of the ice layer, and which switches the cooling apparatus on or off depending on the variable resistance.

Beverage-vending machines with a container for the storage, cooling and carbonating of drinking water are already known in which the drinking water is cooled the freezing point by means of a cooling apparatus.

A control circuit is connected in series with the cooling apparatus, with two measuring electrodes arranged inside the container to monitor the formation of the ice layer. The values obtained by the measurement electrodes are compared to a given reference value and the cooling apparatus is switched on or off depending on the comparison between the values.

A circuit assembly is known from U.S. Pat. No. 4,655,050 that controls the cooling circuit for at least two cooling regions. Here three sensors are arranged in at least one cooling range for at least two cooling demand criteria and at least one additional cooling range for at least one additional cooling demand criterion. Two sensors are arranged in a container filled with water in the region of the ice layer under formation at varying distances from the cooling apparatus.

Again in this known circuit assembly the values obtained by the sensors are each compared with a given set reference value and the cooling apparatus is switched on or off depending on comparison of the variable measured value to the corresponding set reference value.

Control of the cooling apparatus and the resulting change in the thickness of the ice layer are therefore, however, dependent on the physical-chemical composition of the water which corresponds to a certain specific ohmic resistance. The physical-chemical composition of the water and its appropriate specific resistance value can indeed differ considerably depending on local conditions and possible pre-treatment of the water. Values obtained for the specific ohmic resistance cover the range from $210\Omega/cm$ to $11\ K\Omega/cm$.

Based on this variable property of water, the switch-over points for the cooling apparatus in conventional assemblies can differ greatly depending on the water utilized, and on the given reference value. Consequently, the cooling apparatus produces amounts of ice that deviate from a planned target value.

SUMMARY OF THE INVENTION

In view of these facts, it is a primary object of the present invention to provide an assembly that produces a supply of ice in the water to be cooled independently from the physical-chemical composition of the latter.

An assembly that fulfills this requirement is specially characterized according to the invention in that, inside the container, a second measuring electrode connected to a control circuit assembly is located at a greater horizontal distance than the first measurement electrode from the side wall of the container which provides a variable reference resistance value for switching the cooling apparatus, and that the vertical distance of the first measurement electrode is less than that of the second measurement electrode from the container floor, and that the control circuit assembly switches on the cooling apparatus connected to it as soon as the ohmic resistance obtained by the first measurement electrode is smaller than that obtained by the second measurement electrode, and that the control circuit assembly switches off the cooling circuit in the event that the relationship of the two resistance values is reversed.

The invention is distinguished by several advantages. The assembly can be universally installed independently from local water quality. Hence analysis of the physical-chemical composition of the local water and insertion of the reference values corresponding to its properties into the assembly are no longer needed. It is also no longer necessary in accordance with the present invention to subject the assembly to a set reference values or to one or more test runs.

A particularly simple circuit construction of the assembly according to the invention is specially characterized in that the resistance obtained by the first measurement electrode forms a first resistance bridge circuit with an additional resistor, and that the reference resistance obtained by the second measurement electrode forms part of an additional resistance bridge circuit, and that the center taps of both resistance bridge circuits are connected to the inputs of a first differential amplifier. This leads to the benefit that the measurement gaps between the first and second measurement electrodes and the inner wall of the container are subjected to higher-frequency pulses of alternating current.

The alternating current is supplied via a first or second capacitor to the measurement electrodes and rectified for analysis.

The first capacitor in particular exhibits less capacity than the second capacitor: for example, the ratio of capacitance values of the first to the second capacitor is about 1:3. Such a dimension leads to a significant difference in the potentials formed at the two capacitors, which correspond to the resistance values obtained at the two measurement electrodes and which are supplied to the first differential amplifier for the purpose of comparing the two potential values. Hereby the comparison to be made by the differential amplifier is less subject to interruption. Relatively inexpensive differential amplifiers can be employed as their low tolerance requirements will suffice.

In an additional favorable form of construction of the assembly according to the invention, the second measurement electrode is connected to the first input of a second differential amplifier, at whose second input is a reference potential corresponding to a target water level in the container. The output of the second differential amplifier switches on an electrically operated valve arranged in the inlet line of the container.

Thereby the second measurement electrode assumes, besides the preparation of a reference value for the cooling demand criterion, performs the extra function of a water-level sensor.

A further favorable form of construction frees chatter from the output signal of the first differential amplifier. Thereby the switching frequency for control of the cooling apparatus is reduced. In another construction format according to the invention, the cooling apparatus is maintained at the current switch status if the water level in the container falls below the second electrode.

Furthermore, the switching frequency for control of the cooling apparatus is advantageously reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF PREFERRED EMBODIMENTS

Figure 1:
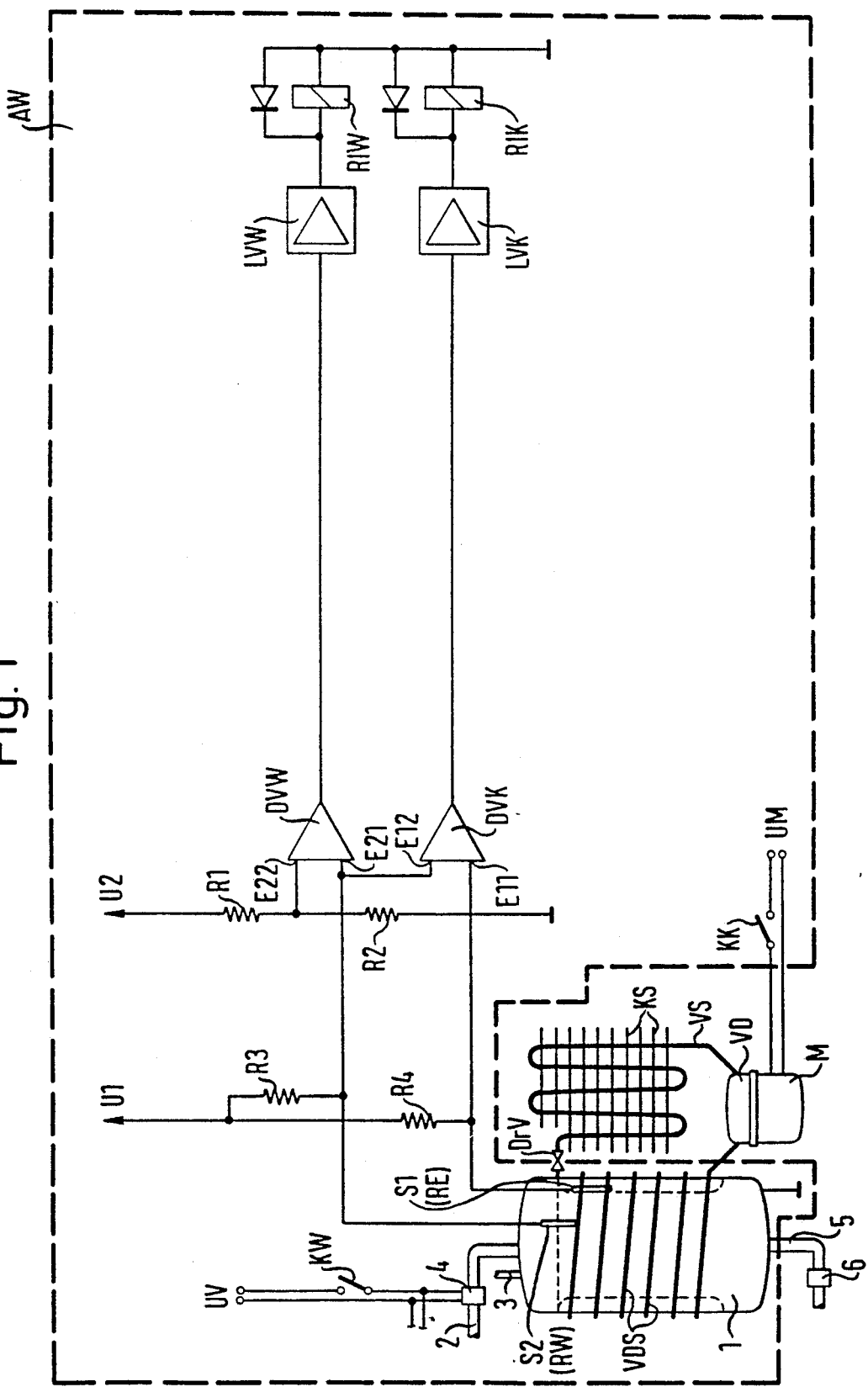
FIG. 1 is a schematic diagram of a carbonator tank, cooling apparatus and control circuit in accordance with the present invention.

The assembly shown in FIG. 1 which is installed particularly in post-mix beverage-vending machines, shows a container (a carbonator tank 1) in the lower left portion of the drawing. This serves for the storage, cooling and carbonating of water and has in its upper area a water inlet tube 2 for introducing water as well as a tube 3 for the introduction of $CO_2$ gas. A valve 4 operated via an electric switch KW is arranged in water inlet tube 2. Switch KW is activated through a relay RIW.

The container 1 has in its lower area an outlet tube 5 for dispensing cooled carbonated ($CO_2$) water. A dispensing valve 6 is arranged in the outlet tube 5.

The cooling circuit for the $CO_2$ water to be cooled in container 1 consists principally of a coolant compressor VD driven by a motor M, a condenser coil VS, an evaporator coil VDS (heat exchanger) and a throttle valve DrV.

The condenser motor M can be switched on or off by a switch KK. Switch KK is activated via a relay RIK.

The evaporator coil VDS consists of a tube coiled around the container 1 and filled with coolant that cools the $CO_2$ water stored in the container 1 in particular to a temperature near and above the freezing point of water. A portion of the carbonated water is stored as ice in order to increase the cooling capacity. The ice layer that forms under the effect of the evaporator coil VDS, shown in FIG. 1 as a dotted line along the vertical side walls of the container 1, is employed as an evaluation criterion for the cooling supply.

The container 1 has an electrically conductive inner wall which is connected to ground. Two measurement electrodes S1 and S2 are arranged inside the container 1 at different horizontal distances from the inner wall of the container. The first measurement electrode S1 is located in the area of the ice layer under formation relatively close to the inner wall, for example, 10 mm, while the second measurement electrode S2 is arranged at a greater distance than the electrode S1 from the inner wall, for example, 26 mm. Both electrodes S1 and S2 are also mounted at different vertical distances from the container floor. The vertical distance of electrode S1 from the container floor is less than that of electrode S2. These distances may be, for example, 74 and 90 mm.

Each of the electrodes S1 and S2 measures the ohmic resistance that forms between the respective electrode and the nearest point on the inner wall of the container (no ice), or—as will be explained later—in the event of ice formation, between the respective electrode and the floor section of the inner wall of the container. In the following description the resistance obtained by electrode S1 will be identified as RE and that by electrode S2 as RW.

The electrodes S1 and S2 and their respectively measured resistances RE and RW form part of a control circuit AW, whose different assemblies are shown in FIGS. 1 through 6.

The control circuit has in particular a first differential amplifier DVK with two inputs E11 and E12. Input E11 is supplied with the potential existing between electrode S1 (if necessary, via a converter D2 and/or a resistor R7 and/or a capacitor C2—see FIG. 2) and the center tap of a resistance bridge circuit, which consists of the resistance RE obtained from the opposite ground (container inner wall) and a series resistor R4 connected to a first voltage source U1.

Figure 2:
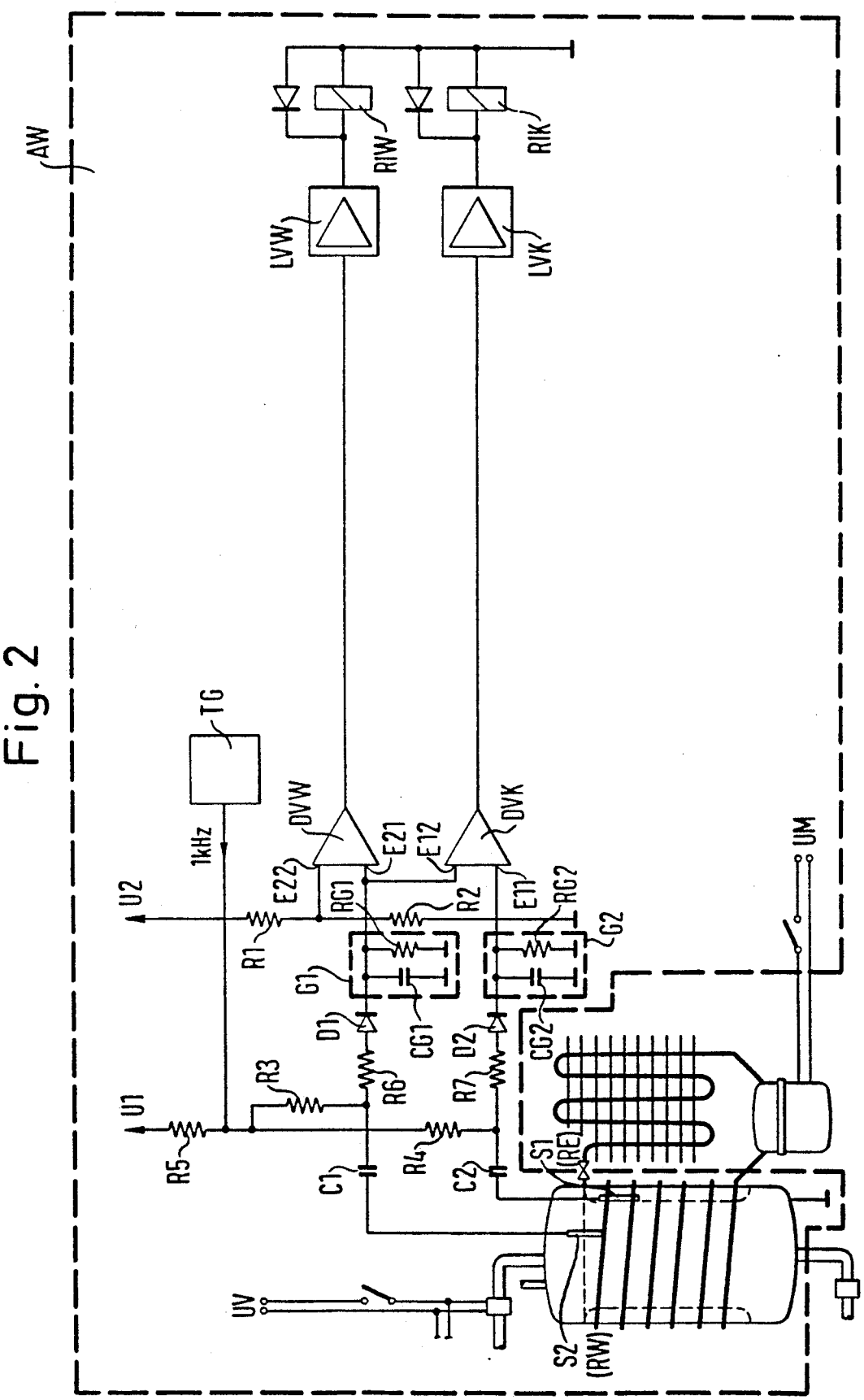
FIG. 2 is a schematic diagram similar to FIG. 1 with the addition of a clock generator.

Input E12 is connected (if necessary, via converter D1 and/or a resistor R6 and/or a capacitor C1—see FIG. 2) to the center tap of a further resistance bridge circuit, which consists of the resistance RW obtained from the opposite ground (container inner wall) and a series resistor R3 connected to a second voltage source U2. Thus input E12 is supplied with the potential existing at the connecting point of resistance RW obtained from the ground opposite to electrode S1 and resistor R4.

The first differential amplifier DVK is so constructed in its circuitry that it emits a signal "1" at its output if the potential at its input E11 is less than at its input E12 (RE<RW). Should, however, the potential at input E11 be the same as or greater than that at input E12 (RE>RW), the differential amplifier DKV emits the signal "0". The output signal "0" or "1" activates switch KK, for example, via a power amplifier LVK and relay RIK, in such fashion that the signal "1" closes it, resulting in voltage UM being applied to motor M of compressor VD and hence activating the cooling apparatus, while the signal "0" opens switch KK and hence deactivates the cooling apparatus.

The first differential amplifier DVK is supplied with a potential both from resistance value RE obtained by the first electrode S1 and from resistance value RW obtained by the second electrode S2. Both potentials are a function of the variable resistors RE or RW which in turn depend on the physical-chemical composition of the water or ice as well as the geometry of the corresponding measurement gap. They are additionally a function of the ice layer forming on the inner wall of the container.

It will initially be assumed that the container 1 is filled with water so that both electrodes S1 and S2 are submerged in the water (dotted horizontal line in Container 1—see FIG. 1) where no ice has yet formed. Switch KK is open so that motor M of compressor VD is at rest.

The water in container 1 forms an infinite number of parallel resistors between the respective electrode and the electrical inner wall of the container 1 which is connected to ground. The dominant resistor in a parallel connection of several resistors is known to be the smallest of these resistors. Thus, in the present case, the horizontal gap between the respective electrode and the inner wall of the container 1 forms the dominant resistor. Owing to its closer proximity to the container wall, the resistance RE obtained by electrode S1 is smaller than the resistance RW obtained by electrode S2. Given the further condition that both resistors R3 and R4 located at U1 are of equal size, input E11 is set at a smaller potential than input E12 of differential amplifier DKV. This produces the output signal "1" and thereby closes switch KK with the result that ice forms on the vertical wall of the container 1.

Ice has a higher specific electrical resistance than water. During the period in which the ice layer, forming vertically in approximately uniform fashion, has not yet reached the first electrode S1 located deeper and closer to the inner wall of the container, this electrode continues to obtain a resistance RE that is smaller than RW owing to the difference in vertical distance of the two electrodes from the floor section of the inner wall of the container. The differential amplifier DVK continues to emit the signal "1", so that switch KK remains closed, motor M of the compressor VD continues to run and the ice layer thickens.

This process continues until the ice layer surrounds electrode S1 while electrode S2 remains ice-free. The resistance RE now has a higher value than RW with the result that the potentials at inputs E11 and E12 of differential amplifier DVK are reversed accordingly. The potential at E11 is then greater than that at E12; DKV emits the signal "0" with the result that switch KK opens and motor M of compressor VD is deactivated.

The growth of the ice layer is thereby halted. This layer will melt depending on such factors as ambient temperature, heat insulation value of the container 1, also quantity and temperature of any fresh water supplied, and thus the resistance ratio of RE to RW will again be reversed with consequently renewed activation of the cooling apparatus.

The control circuit AW shown in FIG. 1 contains a second differential amplifier DVW with two inputs E21 and E22.

Input E21 of differential amplifier DVW is connected to input E12 of differential amplifier DVK, so that input E21 is thus also supplied with the potential existing between resistance RW obtained from the ground opposite the second electrode S22 and resistor R3 connected to voltage source U1.

Input E22 is connected to the center tap of a further resistance bridge circuit that consists of a resistor R2 connected to ground and a series resistor R1 which is connected to the second voltage source U2. Thus input E22 is supplied with a fixed reference potential existing at the connecting point of resistors R1 and R2. Preferably U1=U2, R1=R2 and R3=R4. Resistors R1 and R3 can also be variable resistors in order to provide variable threshold settings for the differential amplifiers DVW and DVK.

The second differential amplifier DVW can be constructed with circuitry identical to that of the first differential amplifier DVK. The resistance RW obtained by electrode S2 will assume various finite values depending on the thickness of the ice layer so long as the water in the container at least partially covers electrode S2. Should the water level in the container fall below electrode S2, however, the value for RW will be infinite. The potential at input E21 will be U1, which, given the precondition that appropriate dimensions apply to U2 (for example, U2=U1), R1 and R2 (for example, R1=R2), is greater than the reference potential at input E22.

The differential amplifier DVW in this case (especially or only) emits the signal "1" that activates in particular switch KW via a series-connected power amplifier LVW and relay RIW, closing this switch and hence opening valve 4 in the water inlet tube 2 and thus releasing fresh water into the container 1. In the other case, that is of an infinite value for resistance RW, differential amplifier DVW emits a signal "0"; switch KW remains open or is opened and valve 4 closed.

In the control circuit assembly AW shown in FIG. 2, the measurement gaps RE, RW between the first or second measuring electrodes S1, S2 and the inner wall of the container are subjected to pulses of higher-frequency alternating current. The alternating current is supplied via a first or second capacitor C1, C2 to the measuring electrodes S1, S2 and rectified for analysis via the differential amplifiers DVK, DVW (diodes D1, D2).

The control circuit AW as shown also includes a clock generator TG, generating in particular a clock pulse rate of 1kHz, that subjects the measurement gaps (resistances RE and RW) between the first or second electrodes S1, S2 and the grounded inner wall of the container 1 to pulses of alternating current.

The clock generator TG is connected via a resistor R5 to the first voltage source U1 and respectively via the serial circuit of resistor R3 or R4 and the first or second capacitor C1, C2 to the first and second measuring electrodes S2, S1. The potential between R3 or R4 and the first or second capacitor C1, C2 is supplied respectively via a resistor R6 or R7 and one of two in particular identically constructed rectifiers D1, D2 to inputs E12 and E11 of the first differential amplifier DVK. The potentials supplied to inputs E12 and E11 are respectively smoothed via a smoothing circuit assembly G1, G2 which is in each case connected to ground and consists of a capacitor CG1, CG2 and a parallel-connected resistor RG1, RG2.

Input E12 of the first differential amplifier DVK is, as in the assembly in FIG. 1, connected to input E21 of the second differential amplifier DVW, so that both inputs E12 and E21 are supplied with the same potential.

The first capacitor C1 preferably has a smaller capacitance value than that of the second capacitor C2. The ratio C1:C2 is about 1:3 for the previously mentioned distances of electrodes S1, S2 from the inner wall of the container.

C1 thus has an alternating current resistance about three times larger than C2. This dimension for capacitors C1 and C2 increases the potential difference at the connecting points of C1 and R6 as compared to C2 and R7 and thereby at inputs E12 and E11 of operational amplifier DVK and is equivalent to an increase in the distances of electrodes S2 and S1 from the inner wall of the container. An actual and in itself desirable increase in these horizontal distances separating the electrodes from the inner wall of the container is limited by the fact that the maximum distance for electrode S2 is half the diameter of the container 1. The distance of electrode S1 from the inner wall of the container, on the other hand, is determined by the desired maximum thickness of the ice layer being formed.

The increase in the potential difference at E12 and E11 improves the analytical accuracy of the differential amplifier DVK which thus receives a less tolerance-dependent switching characteristic.

Figure 3:
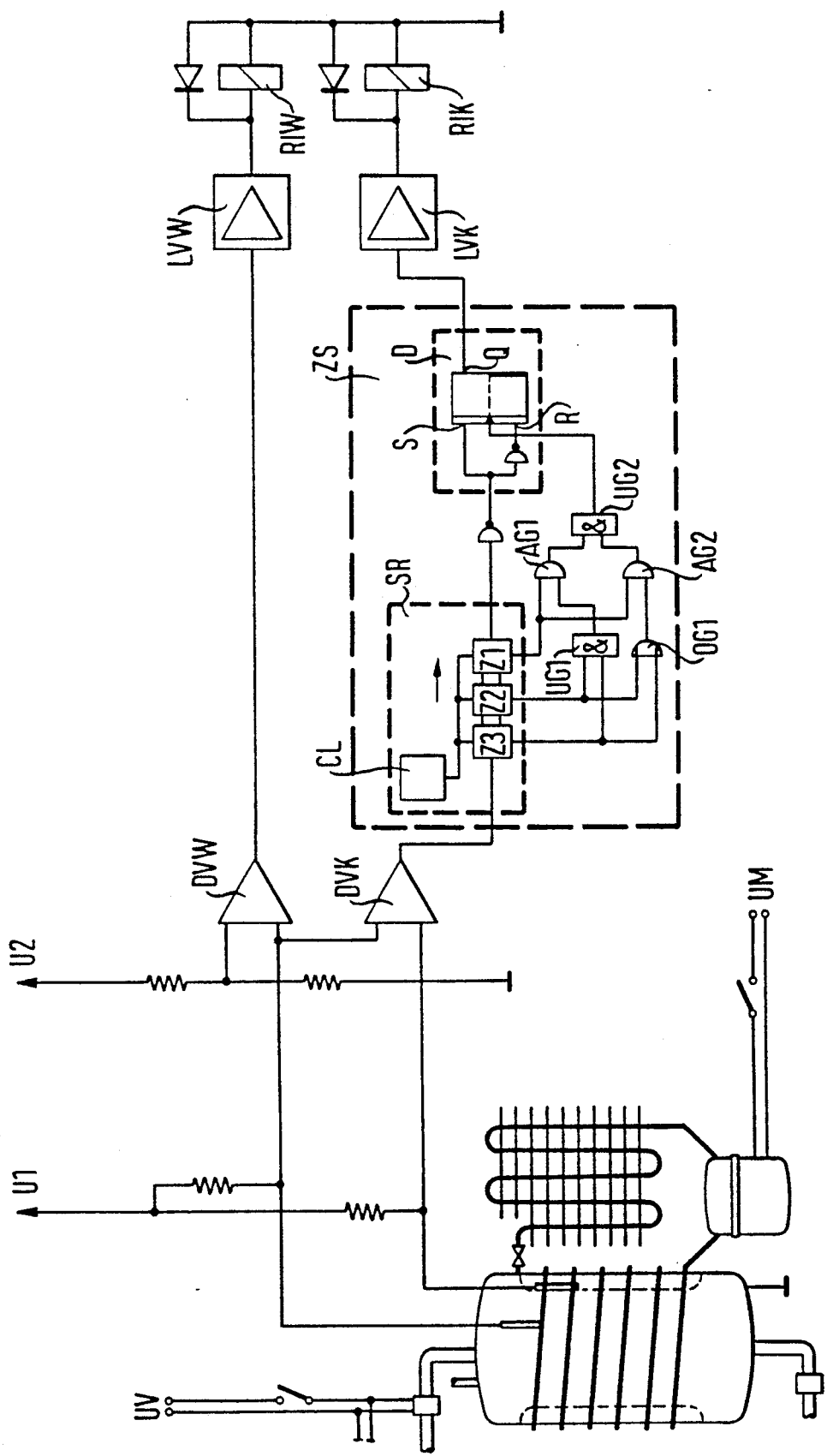
FIG. 3 is a schematic diagram similar to FIG. 1 with the addition of a chatter-free circuit for the water level control.

FIG. 3 shows the control circuit assembly in FIG. 1 where a time control circuit ZS is serially connected behind the first differential amplifier DVK. Circuit ZS is shown in FIG. 3 as an example of a circuit with the following functions. The control circuit AW determines the resistance values RE, RW—obtained from the measuring electrodes S1, S2 —cyclically through the clock generator TG. If then, by means of a reference resistance (for example, RE) obtainable at any moment of inquiry through the first differential amplifier DVK, composes the ratio (RW/RE) of the two resistances (RW, RE), alternatively the ratio of the corresponding potentials dependent on RW and RE (inputs E12 and E11 of differential amplifier DVK) and tests these ratio values against the values of "greater than/equal to 1" and "less than 1". The control circuit AW compares at least three consecutive values of these resistance or potential ratios with each other. Depending on the results of the comparison, the control circuit switches over the cooling apparatus (motor M of coolant compressor VD) only when both the second and third ratio values in time are equal and this ratio value (third in time = second in time) is not equal to the first ratio value in time.

Where more than three ratio values are composed, the second and each subsequent ratio value must be equal to each other and not equal to the first ratio value.

By means of these steps, the output signals of differential amplifier DVK are freed from chatter; the requests for resistance value RW, RE or the corresponding potentials and the comparison through differential amplifier DVK are rendered less susceptible to interruption and thus more securely analyzed.

An example of a circuit for removing chatter can be seen in FIG. 3 in the schematically presented circuit assembly ZS, which is arranged between differential amplifier DVK and power amplifier LVK or between relay RIK and switch KK.

This comprises a shift register SR with three memory cells Z1, Z2 and Z3, which can be made from, for example, flip-flops or more particularly D-flip-flops.

Cells Z1, Z2 and Z3 pick up three consecutive values of the output signal from differential amplifier DVK. Cell Z1 picks up an output signal At1 (time t1), cell Z2 an output signal At2 (time t2) and cell Z3 an output signal At3 (time t3).

Each of the cells has an actuation that is connected to a clock generator CL. The clock pulse rate generated by clock generator CL determines the request periods t1, t2, and t3.

Cell Z3 is connected on its input side to the output of differential amplifier DVK and on its output side to cell Z2 which in its turn is connected to cell Z1. The stored data Atx is shifted from left to right.

Cells Z2 and Z3 are also connected to an AND gate (UG1) and an OR gate (OG1). At the output of gate UG1 a "1" appears only if the contents of both memory cells Z2 and Z3 are equal to "1"; at the output of the OR gate OG1 a "0" appears only if the contents of both memory cells Z2 and Z3 are equal to "0".

Memory cell Z1 is connected to an exclusive gate (=Exclusive OR gate) AG1 and an exclusive gate AG2. Gate AG1 is further connected on its input side to the output of AND gate UG1 and gate AG2 is further connected on its input side to the output of OR gate OG1.

Thus at the output of the exclusive gate AG1, a "1" appears in the following three combinations of the input variables At1, At2, At3 (at Z3, Z2,Z1) : "0","0","1";"0", "1","1" and "1","1","0". Only on the first and third of these combinations should cooling apparatus M be switched over, as here the previously mentioned condition applies that the second and third values in time of output signal of amplifier DVK are equal (At2 at Z2=At3 at Z3) but this value is not equal to the first value in time (At1 at Z1).

At the output of the exclusive gate AG2 a "1" appears in the following four combinations of the input variables At3, At2, At1 (at Z3, Z2, Z1):"0","0","1","0","1","0"; "1","0","0" and "1","1","0". Only on the first and fourth of these combinations should cooling apparatus M be switched over, as here again the previously mentioned condition applies that the second and third values in time of the output signal of amplifier DVK are equal (At2 at Z2=At3 at Z3) but this value is not equal to the first value in time (At1 at Z1).

A comparison of the two groups of combinations where a "1" appears at the output of gate AG1 or at the output of gate AG2 shows that the first combination "0","0","1" from the first group is equal to the first combination from the second group and that the third combination "1","1","0" from the first group is equal to the fourth combination from the second group. These two combinations for At3, At2, At1 (at Z3, Z2, Z1) equal to "0","0","1" and "1","1","0" are the same combinations at which the previously mentioned condition regarding the equality of At3 (at Z3) and At2 (at Z2) and the inequality of At3 (at Z3)=At2 (at Z2) ≠At1 (at Z1) applies and hence at which cooling apparatus M should be switched over.

The outputs of the exclusive gates AG1 and AG2 lead thence to an AND gate UG2 at whose output a "1" then always appears if cooling apparatus M is to be switched over. The output of AND gate UG2 leads thence to the pulse input of a D-flip-flop, that is an SR-flip-flop, where the R input is addressed via an inverter stage together with the S input. The S input of the D-flip-flop used here is connected via an inverter stage to cell Z1 which picks up the value At1. On the arrival of a clock pulse "1", emitted from the output of And gate UG2, at the clock input of the D-flip-flop, the negated value (−At1) of the data (At1) originally contained in Z1 which adjoins the S input of the D-flip-flop is placed in memory and switched through to the Q output. At the Q output there thus appears the following:

At input combinations At3, At2, At1 (at Z3, Z2, Z1) equal to "0","0","1" there is a "0" at the S input. A "1" is delivered as already described from the output of AND gate UG2 to the clock input. By means of the clock pulse the "0" is switched through from the S input to the Q output of the D-flip-flop. The cooling apparatus M is switched off.

This switching off is delayed—apart from the internal switching times in the shift register SR,the gates and the D-flip-flop—by an inquiry period determined by the frequency of clock generator CL.

At input combinations At3, At2, At1 (at Z3, Z2, Z1) equal to "1", "1", "0" there is a "1" at the S input. A "1" is delivered as already described from the output of the AND gate UG2 to the clock input. By means of the clock pulse the "1" is switched through from the S input to the Q output of the D-flip-flop. The cooling apparatus M is switched on.

This switching on is delayed—apart from the internal switching times in the shift register SR, the gates and the D-flip-flop by an inquiry period determined by the frequency of clock generator CL.

The periods during which cooling apparatus M is switched on or off are lengthened through the already described logical interconnection circuit (shift register, gates, D-flip-flop) as compared to the format of the control circuit AW as in FIG. 2.

The inquiry periods can be varied by appropriate alterations to the clock frequency supplied by clock generator C1. Moreover, a shift register SR can be employed that contains more than three cells. Further in themselves conventional circuits for removing chatter can also be added. Here, for example, belongs a binary counter addressed from differential amplifier DVK via a logical interconnection circuit. The logical interconnection circuit increases the count by respectively one unit if differential amplifier DVK emits a signal "1" and reverses the count to 0 if differential amplifier DVK emits a signal "0". Only when the binary counter reaches a predetermined number, for example, "11", does it emit a signal leading to switching over of cooling apparatus M.

Figure 4:
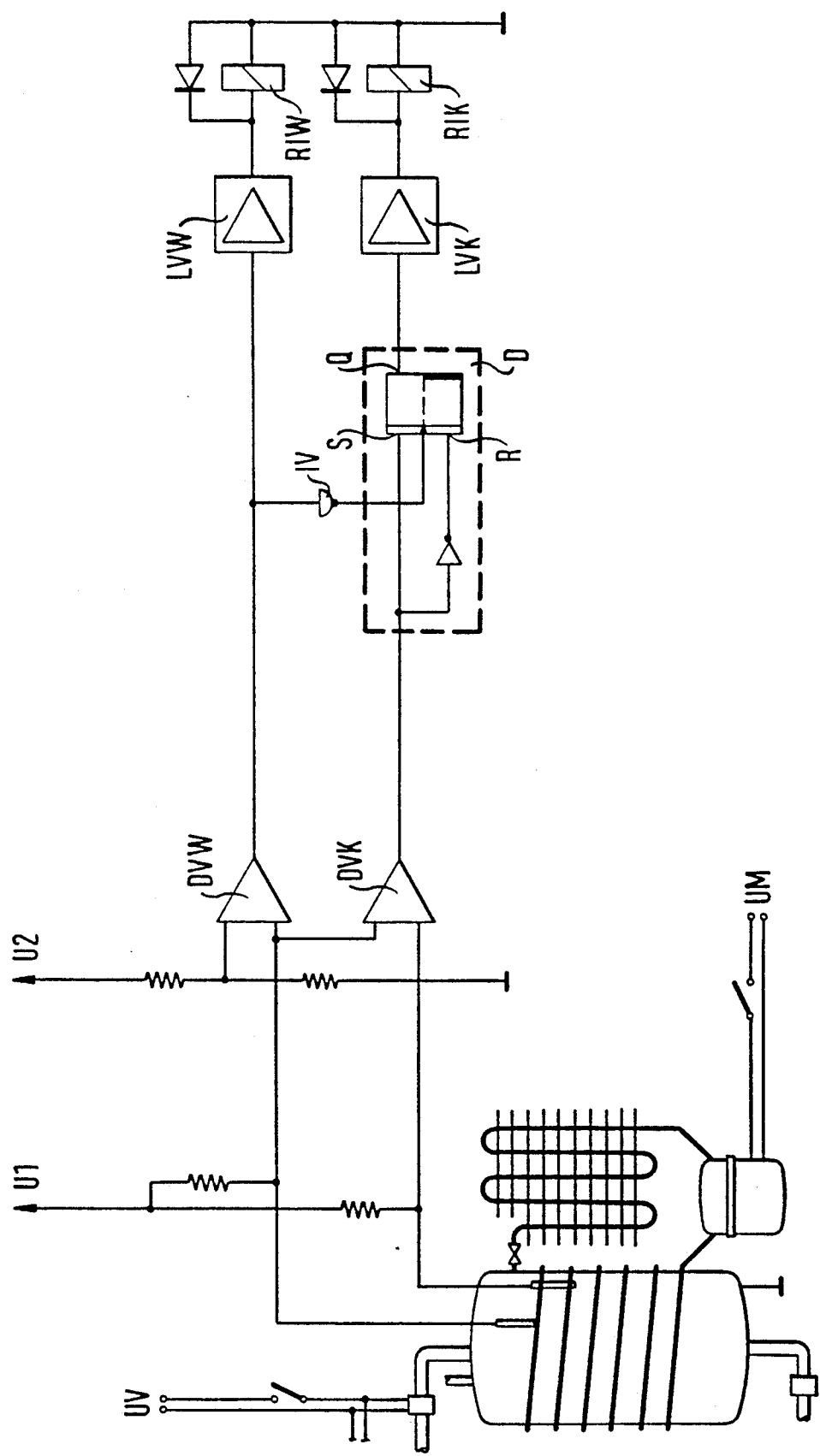
FIG. 4 is a schematic diagram similar to FIG. 1 with a chatter-free circuit controlled by the water level in the carbonator tank.

FIG. 4 shows an example of a control circuit AW in which a signal supplied from the water level in container 1 controls not only the inlet of fresh water (via LVW, RIW, KW, Valve 4—see FIG. 1), but also activates switching over of the cooling apparatus M.

The control circuit AW is then so constructed that it does not switch over cooling apparatus M on the occurrence of an infinite value for resistance RW obtained by the second measuring electrode S2.

In such a construction of control circuit AW, the output of the first differential amplifier DVK can lead to the preparative input S of a D-flip-flop. The latter consists principally of an SR-flip-flop where input R is addressed via an inverter together with input S. The clock input of the D-flip-flop is connected to the output of the second differential amplifier DVW via an inverter IV.

The second differential amplifier DVW then always produces, as earlier described in FIG. 1, an output signal "1" if the water level in the container 1 falls below electrode S2 (RW equals infinity).

The data arriving at input S, that is the output signal "0" or "1" from the first differential amplifier DVK, is switched through to output Q of the D-flip-flop if a clock pulse "1" is supplied from the clock input. Such a clock pulse "1" is produced at a DVK output signal "0", which results from finite values for RW (water level in container 1 at least partially covers measuring electrode S2).

Should the output signal from the second differential amplifier DVW be "1" (RW equals infinity, as the water level has fallen below measuring electrode S2), DVW switches valve 4 in inlet line 2 via relay RIW and switch KW. This output signal "1", however, leads to no clock pulse (that is pulse "0") for the D-flip-flop, thanks to the inverter IV, so that the data arriving at the S input is not switched through to the Q output. The cooling apparatus is therefore not switched over.

Figure 5:
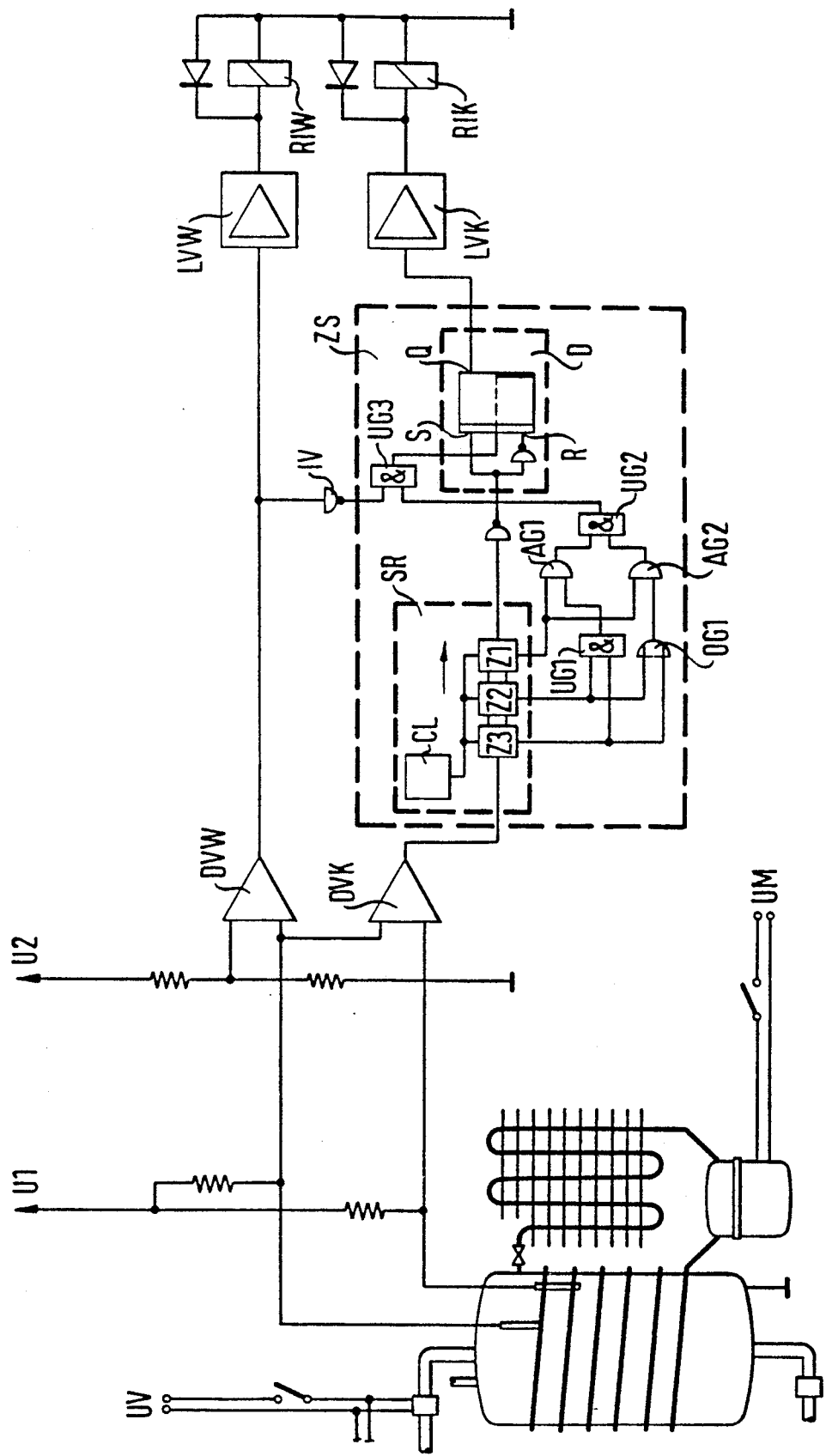
FIG. 5 is a system including a combination of the circuits of FIGS. 3 and 4.

FIG. 5 shows a control circuit AW which combines the circuit functions described in FIGS. 3 and 4. The control circuit as in FIG. 5 differs from the control circuits of FIGS. 3 and 4 in that the logical interconnection circuit as in FIG. 3 now contains a further AND gate UG3 whose input side is connected to the output of AND gate UG2 and to inverter IV from FIG. 4 which inverts the output signals of the second differential amplifier DVW. The output of this supplementary AND gate UG3—but not as in the circuit in FIG. 3 the output of the AND gate UG2—leads to the clock input of the D-flip-flop as in FIG. 3.

The AND gate UG3 emits signals "1" and thereby pulses the D-flip-flop whenever AND gate UG2 and inverter IV respectively emit signals "1". The AND gate UG2 emits signals "1" where input combinations At3, At2, At1 (at Z3, Z2, Z1) are equal to "0","0","1" and "1","1","0", that is in those cases where according to the conditions described in FIG. 3 the cooling apparatus should be switched over. The inverter IV emits signals "1" if the second differential amplifier DVW emits signals "0", that is in those cases where resistance RW at the second measuring electrode S2 has finite values and hence the water level in container 1 has not fallen below the second measuring electrode S2.

A fall of the water level below electrode S2 leads to an infinite value for resistance RW and thus to an output signal "1" at the second differential amplifier DVW, further also to a signal "0" at the output of inverter IV and—independently from any further UG input value—to a signal "0" at the output of AND gate UG3. Thus, in this layout of the analysis circuit as in FIG. 5, a fall of the water level in container 1 delivers no clock pulse to the D-flip-flop. The cooling apparatus M remains at its current switch status (switch KK open or closed).

Figure 6:
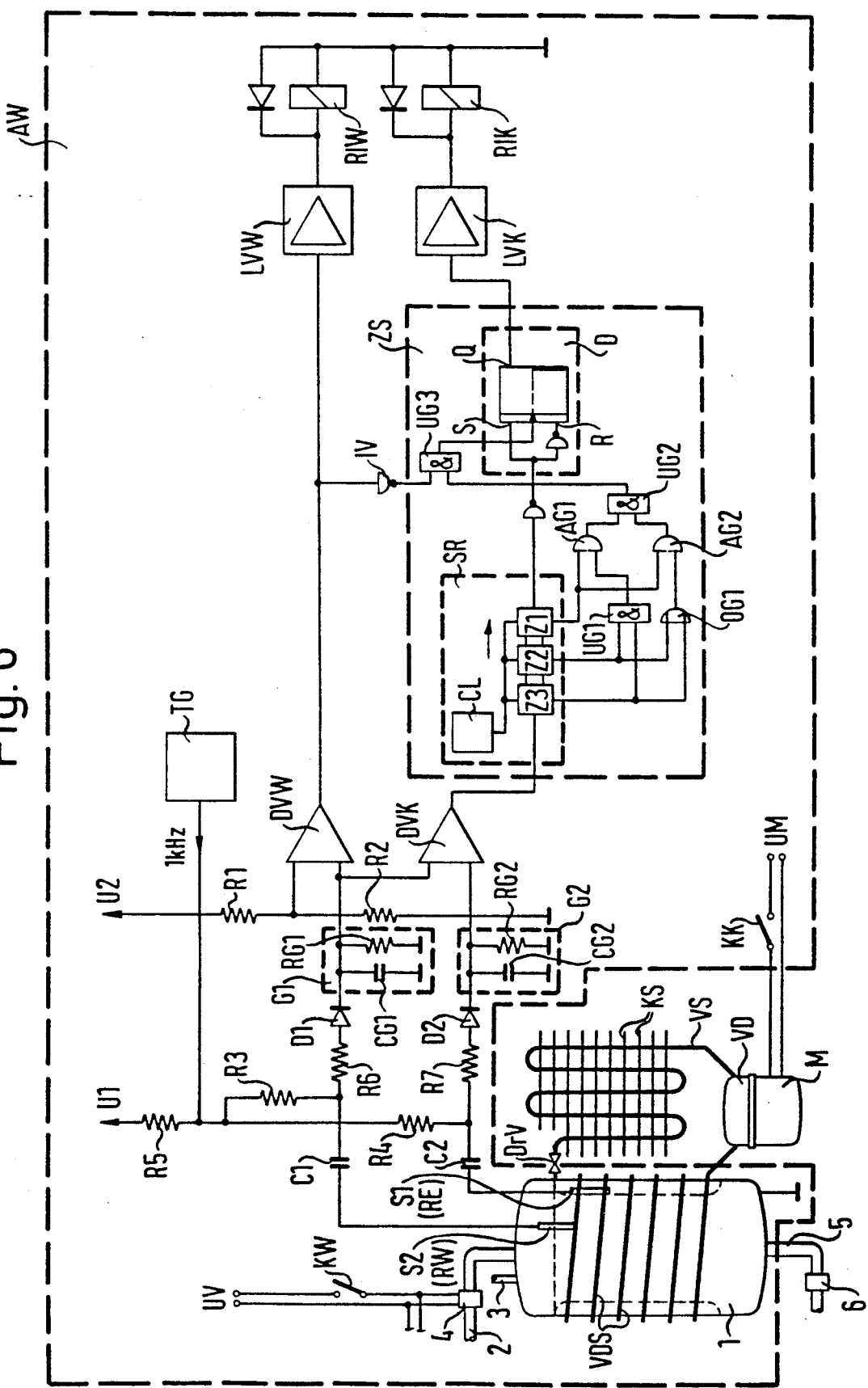
FIG. 6 is a system including a combination of the circuits of FIGS. 2 to 5.

FIG. 6 shows a preferred embodiment that includes a combination of the control circuits as in FIGS. 2 and 5. The construction format as in FIG. 6, based on the format as in FIG. 1, includes the circuit functions described in FIGS. 2 through 5.

The control circuit AW (FIGS. 2 through 6) contains a microprocessor circuit which fulfills at least the functions of the clock generator (FIGS. 2 and 6) and of the various time control circuits (FIGS. 3, 5 and 6).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an assembly, especially for a beverage-vending machine, with a container for storing, cooling and carbonating water, having an inlet and an outlet and an electrically conductive inner wall, in which the water is cooled by an ice layer formed on the container's inside wall area by means of a heat exchanger of a cooling apparatus arranged in the area of a side wall, and with a control which, and the container's inner wall, depending on ice layer thickness thereon forms an ohmic resistance which is variable based on the physical state of the water, and said ohmic resistance switching the cooling apparatus on or off depending on a variable reference resistance value, the improvement comprising:

a second measuring electrode in the container connected to the control circuit disposed at a greater horizontal distance than the first measuring electrode from the container's inner wall, said second measuring electrode supplying the variable reference resistance value for the on or off switch-over point of the cooling apparatus, the vertical distance of the first measuring electrode being less than the corresponding vertical distance of the second measuring electrode from a bottom of the container, the control circuit assembly switching on the cooling apparatus whenever the ohmic resistance obtained by the first measuring electrode is smaller than the ohmic resistance obtained by the second measuring electrode and the control circuit switching off the cooling apparatus in the event that the ratio of the two resistance values is reversed.

2. The assembly as in claim 1, wherein the resistance obtained by the first measuring electrode forms a first resistance bridge circuit with a further resistor, the reference resistance obtained by the second measuring electrode forming part of a further resistance bridge circuit and center taps of both resistance bridge circuits being connected to the inputs of a first differential amplifier.

3. The assembly as in claim 1, wherein the measuring gaps between the first or second measuring electrodes and the inner wall of the container are subjected to high-frequency pulses of alternating current.

4. The assembly as in claim 3, wherein the alternating current is supplied to the measuring electrodes via a first or second capacitor.

5. The assembly as in claim 5, wherein the alternating current is rectified by diode means and supplied to the inputs of the first differential amplifier.

6. The assembly as in claim 5, wherein the control circuit includes a clock generator connected between a voltage source and the second and first measuring electrodes, respectively, in series via a first or second resistor and the first or second capacitors, and the potential between the first or second resistors and the first or second capacitors is supplied to the first differential amplifier, via the diode means and a smoothing circuit which is connected to ground, said smoothing circuit including a capacitor with a parallel-connected resistor.

7. The assembly as in claim 4, wherein the first capacitor has a capacitance value smaller than that of the second capacitor.

8. The assembly as in claim 8, wherein the ratio of the capacitance values of the first and second capacitors is approximately ⅓.

9. The assembly as in claim 2, wherein the second measuring electrode is connected to a first input of a second differential amplifier, at the second input of which there exists a reference potential corresponding to a target level for the water in the container, and the second differential amplifier on its output side switches an electrically operated valve arranged in the water inlet line of the container.

10. The assembly as in claim 2, wherein the control circuit assembly includes time control means for cyclically determining the resistance values obtained by the measuring electrodes, composes the ratio of the resistance values or the corresponding potential values at every inquiry period with respect to a reference resistance or a corresponding reference potential, tests this ratio against the values "greater than/equal to 1" and "less than 1", and compares at least three consecutive values of these resistance or potential ratios with each other, and the control circuit switches over the cooling apparatus only if the second and third and, if necessary, further ratio values are equal to each other and not equal to the first ratio value.

11. The assembly as in claim 2, wherein the control circuit includes means to preclude switching over the cooling apparatus on the occurrence of an infinite value for the resistance obtained by the second measuring electrode.

12. The assembly as in claim 10, wherein the control circuit includes a microprocessor circuit which performs at least the functions of the clock generator and the time control means.

* * * * *